May 6, 1958 E. W. SIMANK 2,833,201
SMOKE HOUSE BARBECUE
Filed March 20, 1956 2 Sheets-Sheet 1

INVENTOR.
E. W. Simank
BY
ATTYS

May 6, 1958 E. W. SIMANK 2,833,201
SMOKE HOUSE BARBECUE
Filed March 20, 1956 2 Sheets-Sheet 2
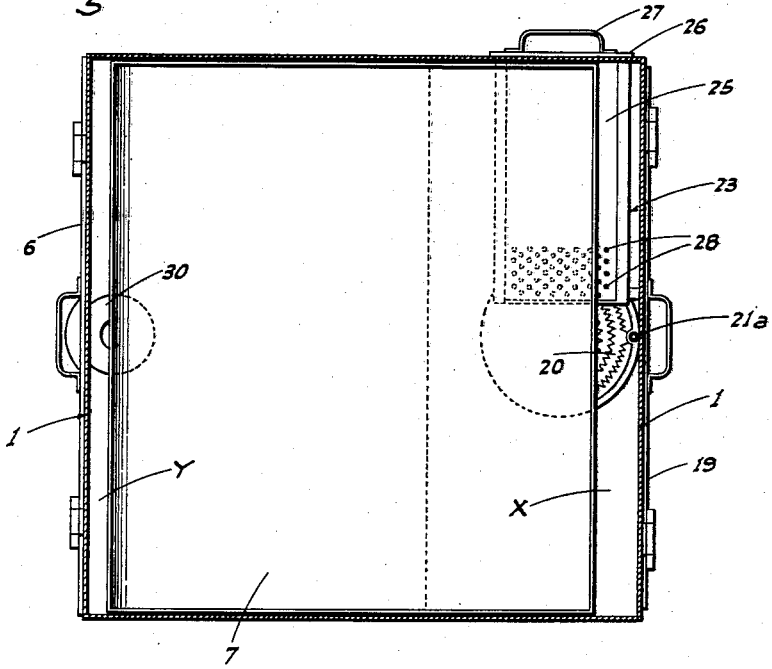
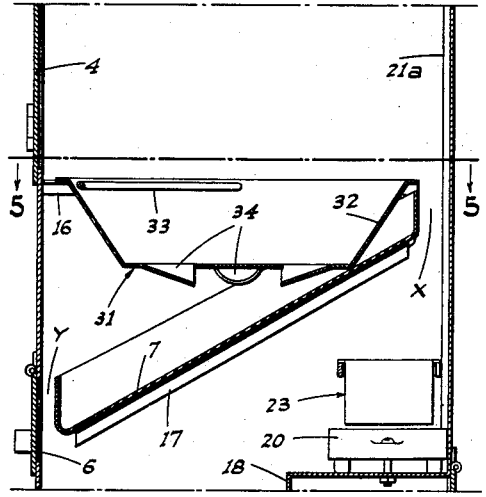
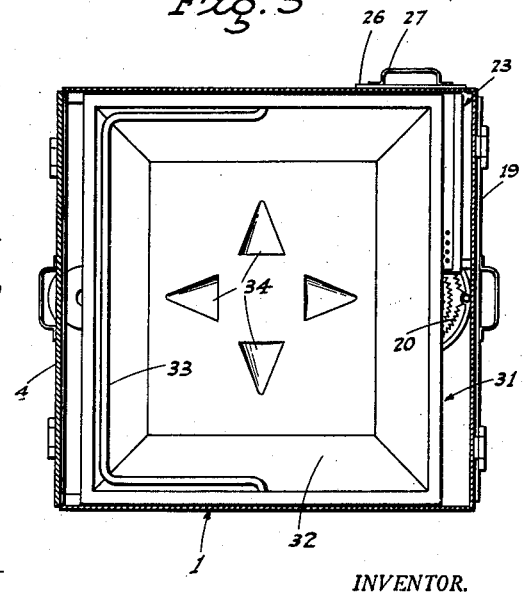
INVENTOR.
E. W. Simank
BY
ATTYS

2,833,201
SMOKE HOUSE BARBECUE

Edmund W. Simank, Carmel Valley, Calif.

Application March 20, 1956, Serial No. 572,652

9 Claims. (Cl. 99—259)

This invention relates to the cooking art and is particularly directed to a combination smoke house and barbecue apparatus capable of being utilized for the preparation and curing of various food products as for example, animal meat, game, fish, fowl and the like through the use conjointly of heat radiation and smoke.

The primary object of the invention is to produce a structure which may be selectively used as either a smoke house or a barbecue oven, but provided, in either instance, with a unique arrangement of parts for effecting an excellent circulation of the radiating heat and smoke, and which latter means also includes, in either instance, an element for catching the drippings and droppings from the food being processed or from the apparatus being utilized.

Another object of the invention is to produce a unit for the purpose set forth which may be made up in a small portable size or in a permanent larger size, but in each instance generally embodying the same basic structure and principle of operation.

Another object of the invention is to provide a unit of the character described which is of sturdy lightweight construction yet efficient in operation and easy to maintain in a clean, sanitary condition.

A final object of the invention is to produce a simple and relatively inexpensive unit which will function for its intended purpose in a highly efficient manner.

These several objects are accomplished by means of a novel assembly and combination of parts as are fully described in the following specification and as defined in the appended claims.

The following specification and the accompanying drawings are directed to an example of a simple portable unit but it is to be understood that the invention may be embodied in units of various sizes, either portable or stationary.

In the drawings:

Fig. 3 is a horizontal cross sectional view taken on a line 3—3 of Fig. 1.

Fig. 4 is a vertical cross section of a portion of the lower end of a unit showing the addition of a fire bowl for use in broiling or barbecuing food products.

Fig. 5 is a cross sectional view of a line 5—5 of Fig. 4.

Figure 1:
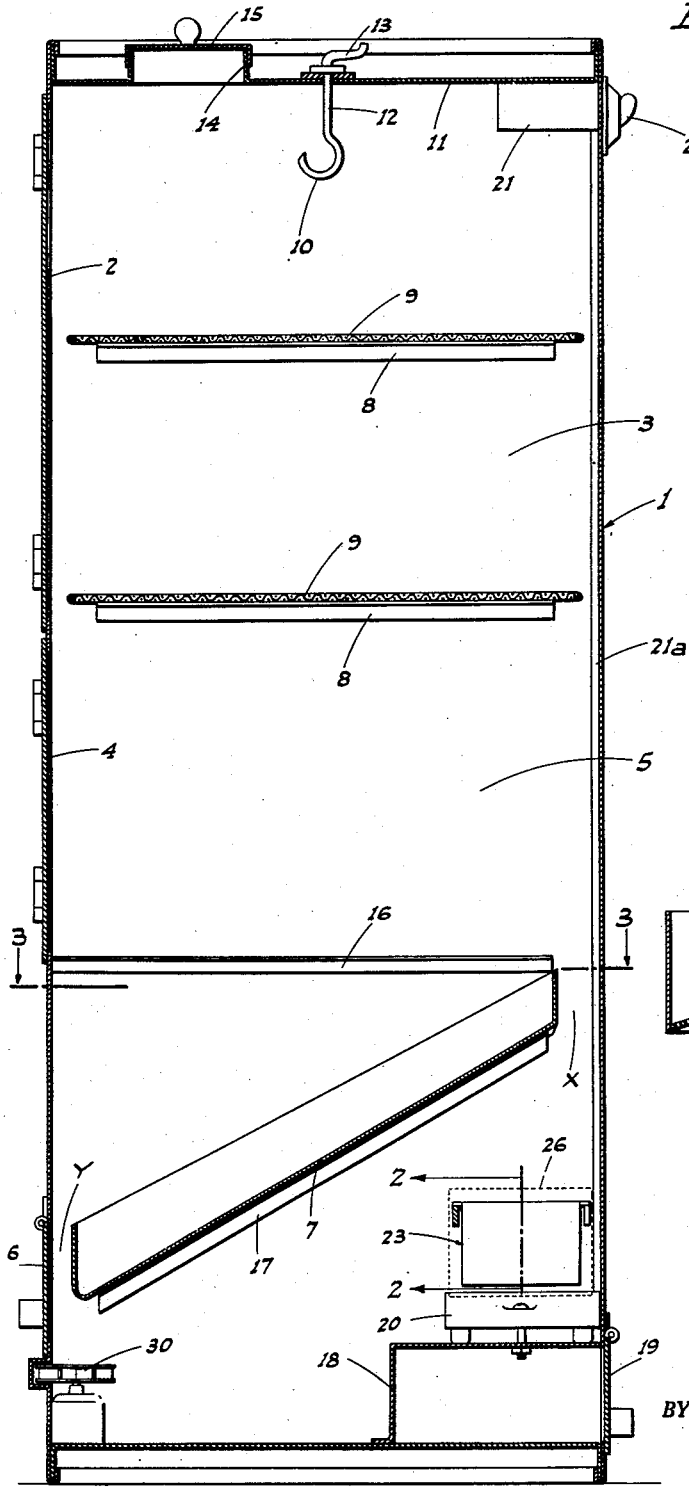
Fig. 1 is a vertical cross section through the unit.
Figure 2:
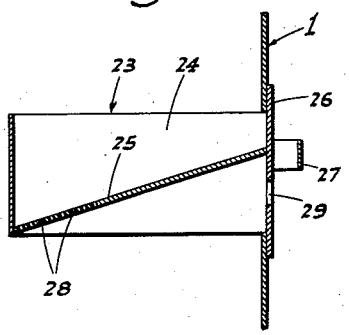
Fig. 2 is a sectional view of a smoke material burner pan taken on a line 2—2 of Fig. 1.

As previously stated, the unit may be made up in various sizes and of various fireproof material. For the purposes of this description there is shown what is preferably a small portable unit of sheet metal and which would preferably be fourteen inches wide, fourteen inches deep, and thirty-six inches high.

Referring now more particularly to the drawings and to the characters of reference marked thereon, the numeral 1 designates generally the housing of the unit which is of sheet metal, forming a compartment provided on its front side with an upper door 2 which opens into a smoke chamber 3, an intermediate door 4 which opens into a barbecue area or chamber 5, and a lower door 6 which provides access to a catch pan and baffle 7; the structure, position and function of which will be later described.

On the sides of the compartment 1, within the area 3, are angle flanges 8 or like supports, which are adapted to support metal gridirons or grates 9 on which may be laid selected food products which it is desired to smoke and which are adapted to lie prone during the smoking process. For such products as will be better smoked or cured when suspended, such as ham, turkey, beef roasts, etc., I provide a hanger hook 10 which is rotatably mounted in the top 11 of compartment 1 and projects above the same where it is provided with a crank handle 12 by which hook 10 and the product suspended thereon may be selectively rotated to uniformly subject the product to the curing smoke and heat provided as hereinafter described. The products in this instance may be supported from the hook in any desired manner but preferably they would be placed in a stockinet which, in turn, would be suspended from the hook.

In the top 11 of the compartment 1 is provided a vent outlet 14 provided with a detachable cover 15 both useful for a purpose as will be later described.

On the sides of the compartment 1, just below the lower end of door 4, are provided angle flanges 16 also useful for a purpose later described.

Below these flanges 16 and angling upward from a point near the door 6 to a point adjacent the inner ends of the flanges 16, are angle flanges 17 on which is removably supported the catch pan-baffle plate 7, which latter is of such a width that when it is in operating position it is spaced from the rear side of the compartment to form an open slot, as at X, and from the front side of the compartment to form an open slot, as at Y. The width of the spacings X and Y vary with respect to each other for a reason important with respect to the modus operandi of the unit as will be later described in detail.

Across the lower back corner of the compartment 1 is provided a substantially rectangular box 18 which serves a definite function in the modus operandi of the unit as will be later pointed out. A door 19 opens through the back wall of the compartment 1 into box 18 so that such box may be used for the storage of the electric extension cord for the unit, pliers, stoker, and other implements which may be used in connection with the operation of the unit. In addition to this function and another to be later described, this box 18 serves as a support for an electric burner or heater 20, or its equivalent, such as a gas burner or the like; such heater or burner being bolted or otherwise fastened to the box 18. In every instance, the top or heat radiating surface of the element 20 must lie in a horizontal plane which is at or above the horizontal plane in which lies the lower front edge of the pan 7.

A conventional thermostatic heat control element 21 extends into the compartment 1 immediately adjacent the top end thereof and has a conventional set control dial 22 for adjustment thereof to desired temperatures. This heat control element is wired in any convenient method to the element 20; the wires preferably passing through a conduit 21a on the back wall of compartment 1.

Removably inserted into the compartment 1 from any convenient point so that it will come to rest substantially in contact with the upper surface of heater or burner 20, is a burner box indicated generally at 23 and adapted to receive sawdust or equivalent material which will smolder when ignited and create smoke for use in smoke curing the food products. This box 23 is preferably made up of separable parts to permit it to be readily cleaned. These consist of a rectangular open-sided frame 24 into which slides an inclined plate 25 having a front cover plate 26 and handle 27. The lower end of plate 25 is perforated as at 28, and vent holes 29 are formed in the cover 26 below plate 25 so that air required for burning the smoke-forming material may pass through holes 29 and perforations 28 to the material in box frame 24 resting on plate 25. Fire or heat from element 20 ignites this material.

The relative size of the opening X, with respect to the size of the opening Y, is of importance in the invention, being essential to the attainment of the proper circulation and diffusion of the radiating heated, smoke filled air through the compartment 1. Since the units may be made up in various relative widths and depths and the areas X and Y would vary accordingly, a formula for arriving at the approximately desired widths of these slots or openings in each instance has been worked out. An example of this formula is set forth below in which the numerals 13 and 23 have been arbitrarily arrived at by experiment. The formula is as follows; all final figures being approximate but sufficiently close to provide efficiency of operation of the unit.

Assume A is the desired overall open area in square inches to be disposed at X over the heater and B is the desired overall open area in square inches to be allowed at the front of the compartment at Y. Assume also that W represents the width of any compartment 1 and D represents the depth of any such compartment. The necessary widths of the openings X and Y in any such compartment can then be arrived at by use of the formula as follows:

$A$ = desired overall open area at X.
$B$ = desired overall open area at Y.
$W$ = width of compartment 1.
$D$ = depth of compartment 1.

$A$ should equal $\frac{W \times D}{13}$ and $B$ should equal $\frac{W \times D}{23}$ $X$ should then equal $\frac{A}{W}$ and $Y$ should equal $\frac{B}{W}$ The following is an application of the formula under one desired size of the compartment:

Assuming the compartment to be fourteen inches wide and fourteen inches deep, then $W$ equals fourteen inches and $D$ equals fourteen inches.

$A$ then equals $\frac{14'' \times 14''}{13} = \frac{196}{13}$ = approximately 15 square inches.

$B$ then equals $\frac{14'' \times 14''}{23} = \frac{196}{23}$ = approximately 8.5 square inches.

$X$ then equals $\frac{A}{W} = \frac{15}{14}$ = approximately 1 inch in width.

$Y$ then equals $\frac{B}{W} = \frac{4}{8.5}$ = approximately ½ inch.

It will be apparent from the above that while the actual widths of slots X and Y will vary according to the relative widths and depths of compartment 1, the relationship should always be such that the width of slot Y will be approximately one half of slot X.

It has been found that by maintaining this relationship the heated air rising from burner 20 will fill compartment 1 above baffle pan 7 and the same will maintain a suction down draft through Y to circulate the air but the temperature in the compartment around the food products being processed will remain substantially constant as is necessary to effective curing and flavoring of such food products.

In some larger units, a small circulating fan 30 may be installed in the space below the slot Y to aid in speeding up air circulation when large quantities of food products are being processed, but in small units this fan is not needed.

The modus operandi of the unit when used as a smoke house will now be described:

The food products to be processed are either laid on the gridirons or grates 9 or suspended from the hook 10. All doors are then closed; the thermostat 21—22 is set at the desired temperature; and the heater 20 is then switched on.

The plane of the top of the heater 20 being above the plane of the lower end of the baffle pan, the rising heated air passes through slot X into the areas 3 and 5. The suction of this rising heated air then pulls the colder air down through slot Y and over the heater 20, thus effecting the continuous circulation essential to the successful operation of the unit.

At the beginning of the operation and before the smoke is started, the cover 15 is removed from vent 14. This allows moisture from the food products to escape, the products being usually dried out at 120° temperature before being smoked. Two to three hours is required for this drying out process.

After the products are dried out to the desired degree, the cover 15 is placed over the vent 14 and the thermostat 21—22 set at the desired temperature for smoking. The pan 23 is filled with smoke making material such as saw-dust or the like and inserted into the compartment into contact with the heater 20. The fire from the heater ignites the material in the pan 23 to cause it to generate smoke. This smoke then moves with the circulating heated air and thus colors and flavors the food products as they are cured.

The inclined baffle pan 7 in addition to its function in cooperation with heater 20 to effect the proper circulation of the air, serves as a catch pan for drippings from the food products such as grease or the like. In the smaller units, the pan is removable for cleaning. In larger units, it may be provided with a conventional drain pipe, not shown, which will allow the grease to flow from the pan while the curing process is in progress.

The heater 20 will be provided with conventional means, as usual, for connecting an electric extension cord thereto.

The box 18, located as it is in the lower back corner of the compartment 1 and below the heater 20, blocks off the dead air space at this point which would otherwise tend to retard the desired free circulation of the heated air and smoke.

In Figs. 4 and 5 is illustrated the manner in which the unit may be utilized as a barbecue. When this is to be done, a barbecue pan or fire box 31 is inserted through door 4 and suspended on flanges 16 above baffle pan 7; the latter serving in this instance to catch ashes or droppings from fire box 31.

The box 31 is a rectangular dish 32 of heavy steel and is provided with a handle 33 for lifting and carrying it. In the underside of the dish 32 there are provided air vents 34. When the box 31 is in place in the compartment 1, one of the grills 9 may be placed over it to function as the grate on which the food products to be barbecued may be place.

From the foregoing description it will be readily seen that there has been produced such a unit for the purpose described as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A device of the character described comprising a housing forming a compartment, means for supporting food products in the upper portion of the compartment, and means for circulating heated air throughout the compartment, such latter means including a solid baffle plate disposed in the housing, such baffle plate being spaced along its edges from the front and rear sides of the housing and inclining upwardly from a point adjacent one of said sides of the housing to a point adjacent the other side, and air heating means disposed at a point below the higher edge of the baffle plate.

2. A device, as in claim 1, in which the opening between the high edge of the baffle plate and the adjacent side of the housing is materially wider than the opening between the lower edge of the baffle plate and the side of the housing adjacent thereto.

3. A device, as in claim 1, in which the horizontal plane in which the top of the air heating means lies is above the horizontal plane in which the lower edge of the baffle plate lies.

4. A device, as in claim 1, in which the baffle plate includes a catch pan.

5. A device, as in claim 1, and including means in the lower corner of the housing below the heating means to eliminate a dead air space at that point.

6. A device, as in claim 5, in which the last named means comprises a rectangular box-like structure built into and substantially filling said corner.

7. A smoke house comprising a housing of rectangular form in plan and forming a compartment having side walls and front and back walls, means in the compartment to support food products in the upper portion of said compartment, a solid baffle plate in the compartment below the food supporting means, said plate being disposed at a substantial angle to the horizontal from one end to the other, and of a size such that the sides of the plate are close to the side walls of the compartment while the ends of the plate are spaced an appreciable distance from the front and back walls of the compartment to provide openings of slot form, and a smoke generating unit in the compartment under the baffle plate at the upper end thereof and clear of the adjacent opening.

8. A structure, as in claim 7, in which the area of the opening at the upper end of the baffle plate is approximately twice that of the opening at the lower end of the plate.

9. A structure, as in claim 7, in which said unit comprises a container for combustible smoke-making material, and a burner under and adjacent the container; the upper edge of the burner lying in a horizontal plane adjacent but above that of the lower end of the baffle plate.

References Cited in the file of this patent

UNITED STATES PATENTS

| 2,338,156 | Allen | Jan. 4, 1944 |

FOREIGN PATENTS

| 722,079 | Germany | June 30, 1942 |
| 831,486 | Germany | Feb. 14, 1952 |